ously wet the layer of carbon black is shallow the treatment is complete and uniform. Further, the process makes it possible to carry out both the production and after-treatment

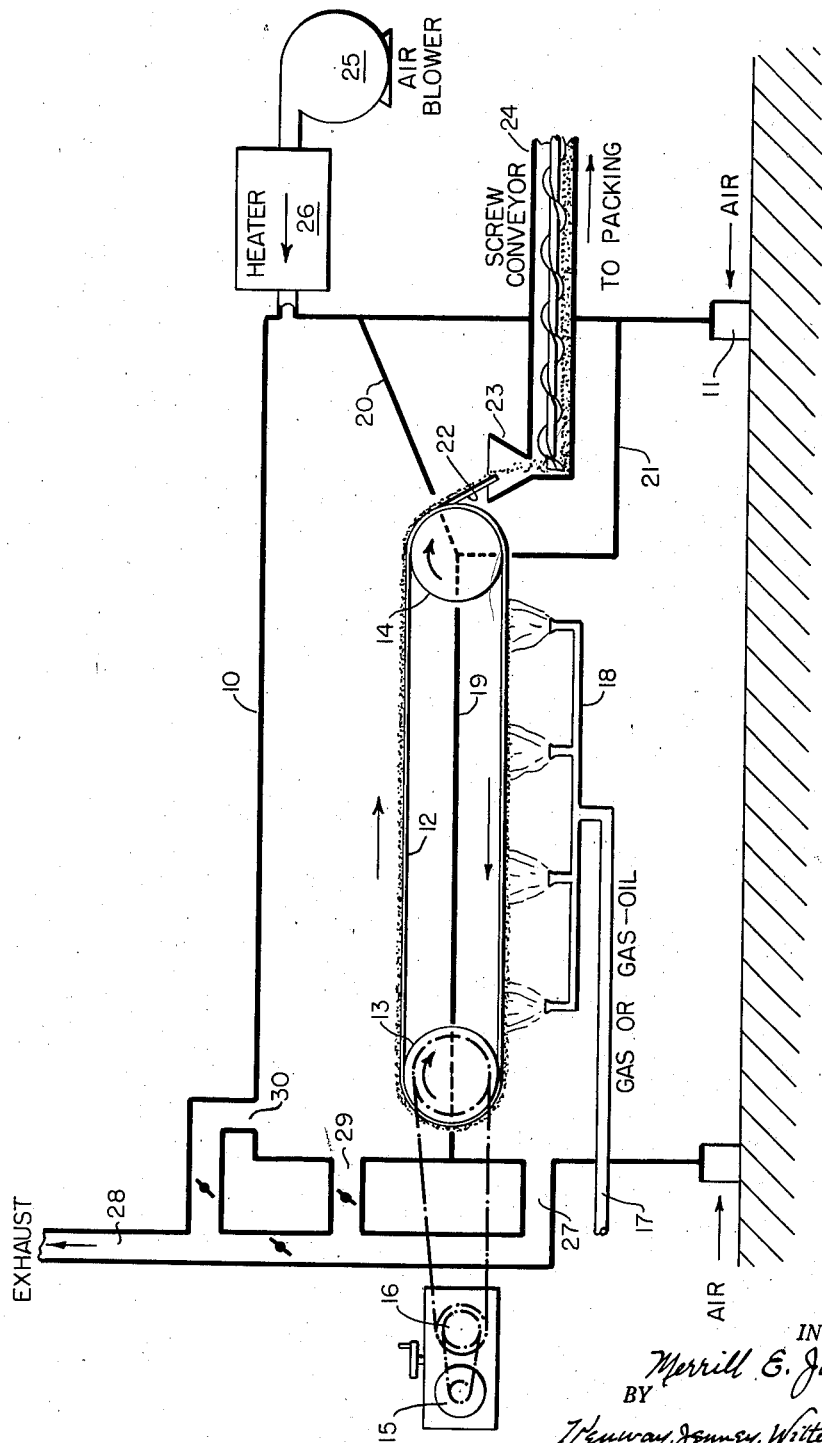

United States Patent Office 2,982,621
Patented May 2, 1961

2,982,621

PROCESS AND APPARATUS FOR PRODUCING AFTER-TREATED CARBON BLACK

Merrill E. Jordan, Walpole, Mass., assignor to Cabot Corporation, Boston, Mass., a corporation of Delaware Filed Dec. 28, 1955, Ser. No. 555,917

7 Claims. (Cl. 23—209.8)

This invention comprises a new and improved process of producing after-treated carbon black. The term "after-treated" is used herein broadly as meaning any change in characteristics imparted to carbon black after its original formation. For example, impingement carbon black is termed after-treated when its volatile content is either decreased or increased from that originally present at the time of its deposition.

The various properties of carbon black such as color, length, flow, iridescence, tinting strength, etc. may be varied or intensified by oxidation, and this has been done heretofore to a more or less imperfect extent in the impingement process of manufacturing carbon black by varying the interval which the carbon black is allowed to remain on the channel irons or rolls. Such procedure has, however, not only reduced the amount of yield but has affected some qualities of the carbon black adversely while improving others.

An alternative process is disclosed in United States Reissued Letters Patent No. 19,664, Damon, in accordance by the steps of depositing carbon black from carbon black to agitation in a drum while subjected to slow oxidation at a temperature below that at which calcining takes place but sufficiently high to increase the stable oxygen content of the carbon black. While this process has proved satisfactory for many years it has been somewhat difficult to insure completely uniform treatment of the product and temperature control has not been as precise as could be desired.

The present invention entirely overcomes the difficulties heretofore encountered and presents important advantages over procedures heretofore known. In one aspect the process of the present invention is characterized by the steps of depositing carbon blahk from carbon forming flame in a shallow layer on a metallic band, removing gaseous products of the flame from contact with the deposited carbon black, and then, without permitting the carbon black to cool, subjecting it to the action of a hot gaseous medium while the carbon black remains undisturbed from its condition of original deposition on the band. It will be apparent at once that by depositing carbon black particle by particle upon the band, an extremely uniform and exposed arrangement of the product is secured and in accordance with the present invention the carbon black is presented to the action of the after-treating gaseous medium while it remains undisturbed in this advantageous condition.

By employing an endless metallic band it is possible to convey the carbon black while hot from the zone of deposition to the after-treating zone. Accordingly the black, which has already been deposited in hot condition, need not be reheated for the after-treatment step. Contact between the deposited carbon black and the after-treating or oxidizing atmosphere is excellent, and since the layer of carbon black is shallow the treatment is complete and uniform. Further, the process makes it possible to carry out both the production and after-treatment of the carbon black in a single compact apparatus and entirely within the hothouse.

The invention includes within its scope the novel apparatus herein shown as employed for carrying out the improved process above outlined. As herein shown this comprises an outer enclosure containing an endless metallic band with burners located beneath the band for depositing carbon black on its outer and under surface, together with means for moving the band to bring the deposited carbon black upon its upper surface, means for directing a hot after-treating gas to the upper surface of the band, and partitions for preventing the mixing of products of combustion of the burners with the after-treating gas.

These and other features and characteristics of the invention will be best understood and appreciated from the following description of one form of apparatus by which the novel process may be carried out, selected for purposes of illustration and shown diagrammatically in the accompanying figure.

The illustrated apparatus includes walls forming an outer enclosure 10 known in the industry as a hot house and usually constructed of sheet steel with air inlet openings 11 provided at intervals along the lower edge of the side walls. An endless metallic band 12 is mounted to run horizontally upon drums 13 and 14 mounted to rotate on horizontal transverse axes. Means for driving the band at a controlled rate of speed are shown herein as a motor 15 operating a speed reducing unit 16 to which the shaft of the drum 13 is connected by a driving belt. The band 12 serves as a relatively cool medium for receiving carbon black by impingement and also as a conveyor for transferring the deposited carbon black from the zone and environment where it is formed to a different after-treated treating environment.

A supply pipe 17 is introduced into the enclosure 11 and connected to a manifold 18 having a series of burners arranged to direct carbon forming flames against the lower, downwardly directed surface of the band 12 as it travels in its lower reach. The enclosure is divided transversely and longitudinally into upper and lower compartments by a horizontal partition 19 apertured to receive the drums 13 and 14, these being located so that the upper and lower reaches of the band 12 travel substantially equal distances above and below the partition 19. The band passes upwardly through the partition about the drum 13 carrying with it in undistributed distribution, and upon its now upwardly directed surface, the carbon black deposited by the flames from the manifold 18.

The partition 19 is joined at its right hand end by supplementary internal partitions 20 and 21 which, with the outer end wall of the hot house, form an outlet or discharge compartment separate from the lower carbon black forming compartment below the partition 19 and also from the upper after-treatment compartment above the partition. The treated carbon black passes downwardly with the band 12 about the drum 14 where it is removed from the band by a scraper 22 disposed substantially tangentially with respect to the drum beneath an aperture in the partition 20.

The after-treated carbon black removed by the scraper 22 is directed into a hopper 23 which leads to a discharged duct 24 containing a screw conveyor.

As herein shown the hot house 10 is provided at its upper right hand corner with an inlet duct through through which hot gas of controlled composition is admitted from a blower 25 and delivered into the upper compartment after being passed through a heater 26 and raised to the required operating temperature.

At its left end the hot house is provided with an outlet duct 27 discharging from the lower or carbon black forming compartment to a stack 28. Temperature controlling discharge ducts 29 and 30 lead from the upper or after-treating compartment to the stack 28. It will be seen that by means of these ducts the temperature and composition of the atmosphere in both compartments may be regulated and that of the lower compartment maintained with an oxygen content somewhat less than that required for complete combustion by the carbon forming flames. Similarly the composition of the hot gas delivered to the upper or after-treating compartment may be regulated and maintained in accordance with the requirements of the work in hand. If it is decided to calcine the carbon black the gas supplied by the blower 25 should be fairly inert or reducing in nature, i.e. containing little free oxygen, ozone or water vapor, etc., and quite hot, generally at least 750° C. and often in the neighborhood of 1000 to 1200° C. On the other hand, if it is desired to increase the volatile content of the carbon black, the gas supplied by the blower 25 should be oxidizing, e.g. air or air having an enriched oxygen content of, for example, about 40 to 60 percent, or a mixture of air with other gases such as steam, ozone, etc.

The temperature of the oxidizing after-treating gas may be varied from about 300° C. on up but preferably will not run above about 750° C.

Having thus disclosed my invention and described in detail typical apparatus for carrying out an illustrative example of the novel process, I claim as new and desire to secure by Letters Patent:

1. Apparatus for after-treating carbon black comprising walls forming an outer enclosure, a horizontal partition dividing the enclosure into upper and lower compartments, an endless band mounted to pass on both sides of said partition, means for maintaining carbon-forming flame in the lower compartment for depositing carbon black upon the under surface of the band, and means for supplying heated gas of predetermined composition to the upper compartment.

2. Apparatus of the class described comprising an outer enclosure transversely divided by a partition into upper and lower compartments, a pair of spaced drums mounted to rotate in apertures formed in the partition, an endless metallic band running upon the drums with reaches disposed above and below the partition, burners for depositing carbon black upon the lower reach of the band, and means for maintaining a heated atmosphere of controlled composition about the reaches of the band.

3. Apparatus of the class described comprising an outer enclosure transversely divided by an apertured partition into upper and lower compartments, an outlet duct at one end of the enclosure and an inlet duct at the other end thereof for differentiating the composition of the atmosphere in the two compartments, an endless metallic band running from one compartment to the other, and means for depositing carbon black by impingement on the band in one compartment whereby it may be treated upon the band in the other compartment in undisturbed condition.

4. Apparatus of the class described comprising an outer enclosure divided by internal partitions into upper and lower compartments and a separate discharge compartment at one end, an endless metallic band guided for movement continuously into all three compartments, burners in the lower compartment for depositing carbon black on the band in its passage therethrough, means for maintaining a hot, gaseous atmosphere in the upper compartment, and means in the discharge compartment for removing carbon black from the band as the band enters that compartment.

5. Apparatus of the class described comprising an outer enclosure, an endless metallic band movably mounted within the enclosure, burners adjacent a portion of the band for depositing carbon black thereon, means for directing a hot gaseous medium to another portion of the band and carbon black thereon, and means for preventing said gaseous medium from reaching the first named portion of the band.

6. Apparatus of the class described comprising a hothouse enclosure, an endless metallic band mounted to run in a horizontal path within the enclosure, burners located beneath the band for depositing carbon black on its under surface, means for moving the band to bring the deposited carbon black upon its upper surface, means for directing a hot oxidizing gas to the said upper surface of the band, and partitions for preventing mixing of the product of combustion of the burners with said oxidizing gas.

7. The process of producing after-treated impingement carbon black which includes the steps of depositing carbon black by impingement upon a downwardly directed surface within an enclosed space to form a shallow layer of carbon black on said surface, inverting the surface and transferring the deposited carbon black into upwardly directed position without substantially disturbing the carbon black on said surface, meanwhile moving said surface into a second enclosed space separated from said first space, and subjecting the carbon black in said second enclosed space to a selectively controlled hot gaseous medium separate and distinct from the gases in said first mentioned enclosed space while the carbon black remains substantially undisturbed on said surface.

References Cited in the file of this patent

UNITED STATES PATENTS

| | | |
|---|---|---|
| 431,881 | Dietrich | July 8, 1890 |
| 2,013,774 | Wiegand | Sept. 10, 1935 |
| 2,830,879 | Dobbin et al. | Apr. 15, 1958 |

UNITED STATES PATENT OFFICE
CERTIFICATE OF CORRECTION

Patent No. 2,982,621                        May 2, 1961

Merrill E. Jordan

It is hereby certified that error appears in the above numbered patent requiring correction and that the said Letters Patent should read as corrected below.

Column 1, line 35, for "by the steps of depositing carbon black from" read -- with which it is proposed to subject impingement --; line 48, for "blahk" read -- black --; column 3, line 48, before "reaches" insert -- upper --.

Signed and sealed this 19th day of September 1961.

(SEAL)
Attest:

ERNEST W. SWIDER                        DAVID L. LADD
Attesting Officer                         Commissioner of Patents

USCOMM-DC